(12) United States Patent
Fralick et al.

(10) Patent No.: US 8,223,339 B1
(45) Date of Patent: Jul. 17, 2012

(54) SCANNING SPECTROSCOPY MODULATION FOR FREQUENCY DOMAIN SPECTRAL ANALYSIS

(75) Inventors: Mark Fralick, San Diego, CA (US); Richard Waters, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 496 days.

(21) Appl. No.: 12/544,071

(22) Filed: Aug. 19, 2009

(51) Int. Cl.
*G01B 9/02* (2006.01)
*G01J 3/45* (2006.01)

(52) U.S. Cl. .......................... 356/454; 356/301

(58) Field of Classification Search .............. 356/301, 356/451, 454
See application file for complete search history.

(56) References Cited

U.S. PATENT DOCUMENTS

| | | | | |
|---|---|---|---|---|
| 4,057,349 A * | 11/1977 | Barrett | .................... | 356/45 |
| 5,838,438 A * | 11/1998 | Peale et al. | .................... | 356/451 |
| 6,763,718 B1 * | 7/2004 | Waters et al. | .................... | 73/514.26 |
| 7,425,453 B1 * | 9/2008 | Hutchens et al. | .................... | 436/165 |
| 2002/0025490 A1 * | 2/2002 | Shchegolikhin et al. | | 430/270.15 |
| 2010/0182608 A1 * | 7/2010 | Zribi et al. | .................... | 356/454 |

\* cited by examiner

*Primary Examiner* — Tarifur Chowdhury
*Assistant Examiner* — Michael P Lapage
(74) *Attorney, Agent, or Firm* — Kyle Eppele; J. Eric Anderson

(57) ABSTRACT

A method for analyzing an optical signal comprising: directing the optical signal into a scanning spectrometer system comprising a variable-wavelength filter and a detector; continuously modulating the variable-wavelength filter at a given modulation frequency to produce a time-based waveform; measuring the time-based waveform with the detector; converting the time-based waveform into a frequency spectrum comprising harmonics of the modulation frequency; and comparing the harmonics of the modulation frequency to premeasured harmonic spectra in a reference database.

20 Claims, 4 Drawing Sheets

SCANNING SPECTROSCOPY MODULATION FOR FREQUENCY DOMAIN SPECTRAL ANALYSIS

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil. Reference Navy Case Number 99418.

BACKGROUND OF THE INVENTION

Spectroscopy can be used as a means to identify the chemical and physical composition of a sample by its unique interaction with incident light. Different samples will produce unique optical signatures in the resulting transmitted or reflected light, which can be used to identify the composition of substances ranging from liquids, solids, gases, polymer films, gels, powders, emulsions, and solutions.

SUMMARY

Disclosed herein is a method for analyzing an optical signal comprising: directing the optical signal into a scanning spectrometer system comprising a variable-wavelength filter and a detector; continuously modulating the variable-wavelength filter at a given modulation frequency to produce a time-based waveform; measuring the time-based waveform with the detector; converting the time-based waveform into a frequency spectrum comprising harmonics of the modulation frequency; and comparing the harmonics of the modulation frequency to premeasured harmonic spectra in a reference database.

An alternative embodiment of the method disclosed herein comprises a method for analyzing a Raman or Surface Enhanced Raman Spectroscopy (SERS) emission from a sample comprising: directing the emission into a resonant cavity of a Fabry-Perot interferometer, wherein the resonant cavity comprises first and second mirrors; modulating the position of the first mirror with respect to the second mirror at a given modulation frequency; measuring a time-based spectrum over time as a function of first mirror position at a detector; taking a Fourier Transform of the time-based spectrum to obtain a frequency-based spectrum centered around the modulation frequency; determining information about the shape of the time-based spectrum based on the phase and amplitude of the harmonics of the modulation frequency; comparing the information to premeasured harmonic spectra in a reference database; and establishing the presence of chemical or biological agents within the sample, by discriminating distinguishing components of each agent within the frequency-based spectrum.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
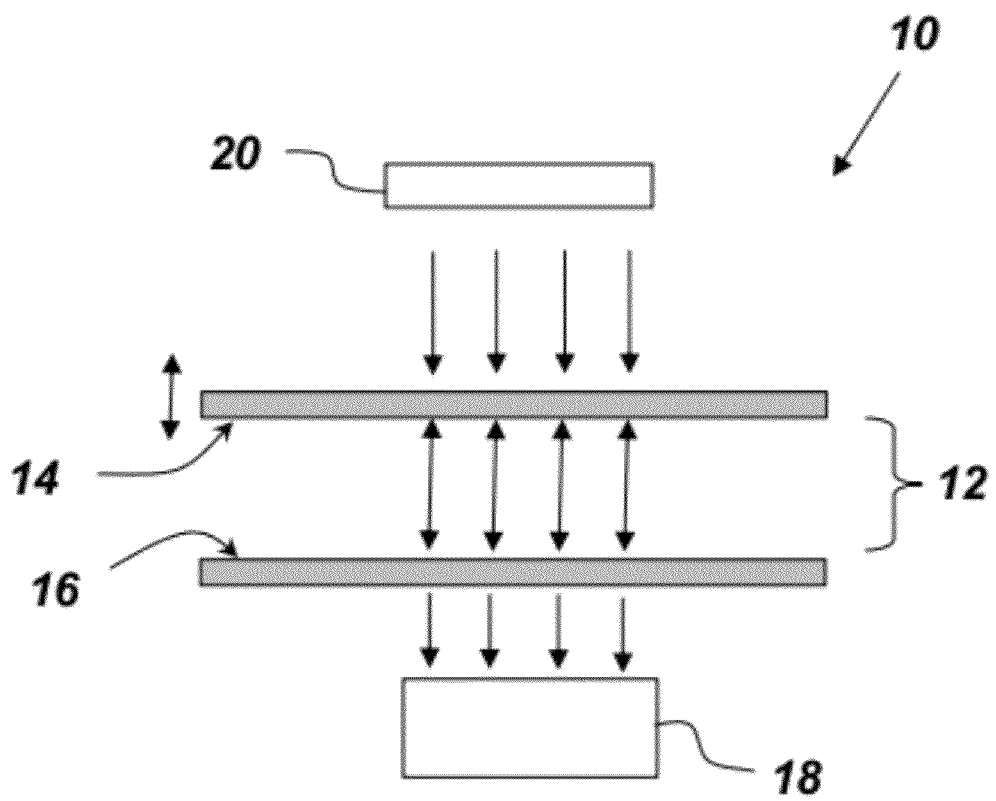
FIG. 1 is a illustration of a Fabry-Perot interferometer.

Spectral analysis of chemical or biological agents is frequently performed by use of a scanning Fabry-Perot interferometer 10, such as that shown in FIG. 1. In this embodiment, the Fabry-Perot interferometer 10 may comprise an optical cavity 12 created by two partially reflective mirrors 14 and 16, which are two parallel reflective surfaces, and an optical detector 18. Partially reflective mirror 14 is movable with respect to the partially reflective mirror 16. Light from a source of light 20 external to the interferometer 10 is brought into incidence with one of the mirrors 14 or 16 of the optical cavity 12, such that part of the light is coupled into the cavity 12, the magnitude of which is determined by the reflectivity of the mirrors 14 and 16. By resonance within the cavity 12, the light undergoes constructive and deconstructive interference, creating a standing wave containing maxima and minima in intensity. The pattern and periodicity of the standing wave depend on the a) wavelength of incident light, b) the spacing between the mirrors 14 and 16, and c) the reflectivity of the mirrors 14 and 16.

A transmission pattern can be created by scanning one of the mirrors 14 or 16 and detecting the resultant light emitted from the cavity 12 with the optical detector 18. The transmission pattern is unique to the incident wavelength, thus allowing it to be identified with high accuracy. When the incident light is composed of light of multiple wavelengths, the resulting transmission pattern is a superposition of transmission patterns. In chemical and biological detection, light is detected which has various light components consisting of multiple wavelengths at different intensities. This composition of light with respect to a specific test sample allows the chemical and physical makeup of the sample to be uniquely identified, as different chemical and physical structures will result in different interactions with light.

The interaction of light with a test sample may be accomplished in several ways. For example, and not by way of limitation, light may interact with a test sample through absorption (wherein specific wavelengths of light are absorbed from a white light source), fluorescence (wherein light is absorbed and reemitted at lower wavelengths), and Raman scattering (wherein the wavelength of incident light is modified by vibrational modes). The light that enters the optical filter may also be a Surface Enhanced Raman Spectroscopy (SERS) emission from a sample.

Figure 2:
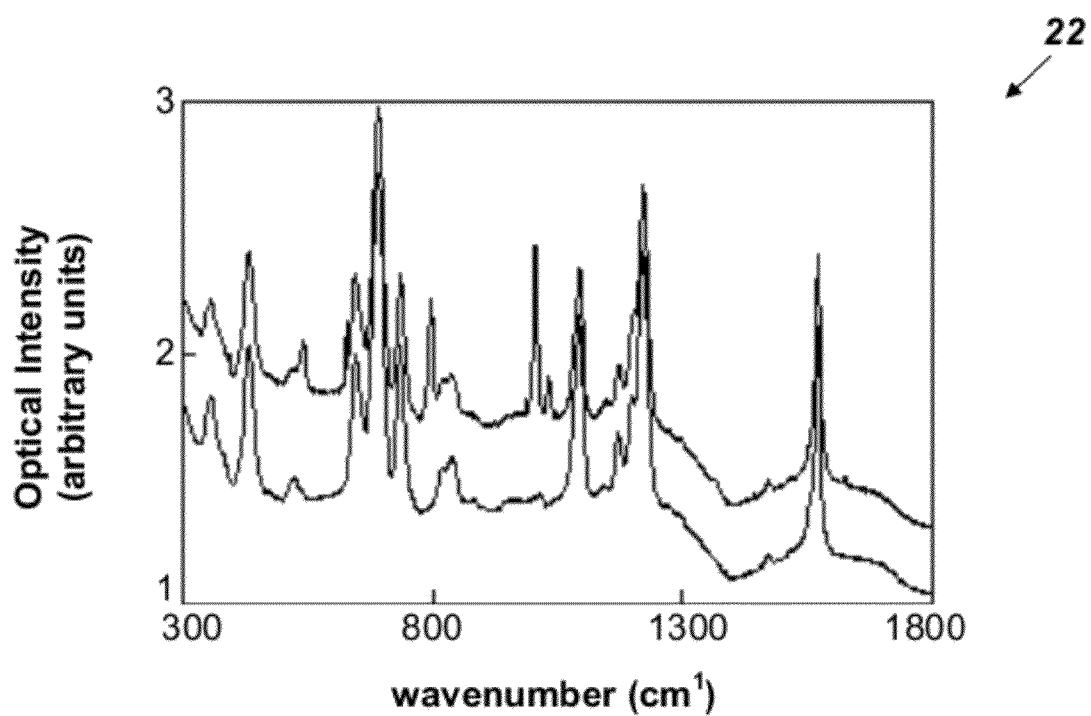
FIG. 2 is a plot of a time domain analog transmission spectrum.

In typical table-top systems, the mirror reflectivity is very high creating a very narrow optical band-pass filter for a fixed mirror spacing. As the mirror spacing is changed a unique wavelength is passed through the cavity to the detector. In this manner, the optical intensity verses wavelength for any sample can be measured. FIG. 2 shows an example time domain analog transmission spectrum 22 representing the optical intensity verses wavelength of a sample substance A.

Once the transmission spectrum 22 has been obtained, it must be analyzed. For example, if substance A is an unknown chemical the measured spectrum 22 may be correlated with a known spectrum, giving a percentage likelihood that the measured chemical matches the chemical profile. More simply, if various features in the known spectrum are deemed to be unique to a substance in question then those features may be monitored. If the features in the measured spectrum 22 match that of the profile in question, then the sample A is determined to be the substance in question within a certain probability. This requires the precise measurement of both the location (along mirror displacement) and amplitude of said features. This measurement is made more difficult by the presence of noise, which can arise from contaminants, optical source power and wavelength fluctuation, mechanical vibration instability of the spectrometer, temperature, finite transmission width of the optical cavity 12 and electronics noise. All of these influences limit the degree to which features in the spectrum 22 can be resolved. Furthermore, resolution depends on the spectrum in question itself, as defining features may be small compared to features at nearby wavelengths. As an aside, no optical filter perfectly filters a specific wavelength of light for a fixed mirror spacing but instead transmits a band of wavelengths around the central transmitted wavelength corresponding to that mirror spacing. Due to this effect, the measured optical spectrum 22 is always somewhat 'blurred' or distorted from the actual optical properties of the substance being analyzed. This distortion can in turn cause difficulties in analyzing the measured optical spectrum 22 and identifying key spectral features. Furthermore, analog spectrums are always open to interpretation either by a trained user who must use his/her judgment in assessing the spectrum 22 or by electronics, and sophisticated algorithms. Always someone must somehow interpret whether or not a peak truly exists and if it does where does it exist and with what amplitude. This is made more difficult by the fact that the optical filter itself distorts the optical spectrum and 'blurs' the measured result.

Figure 3:
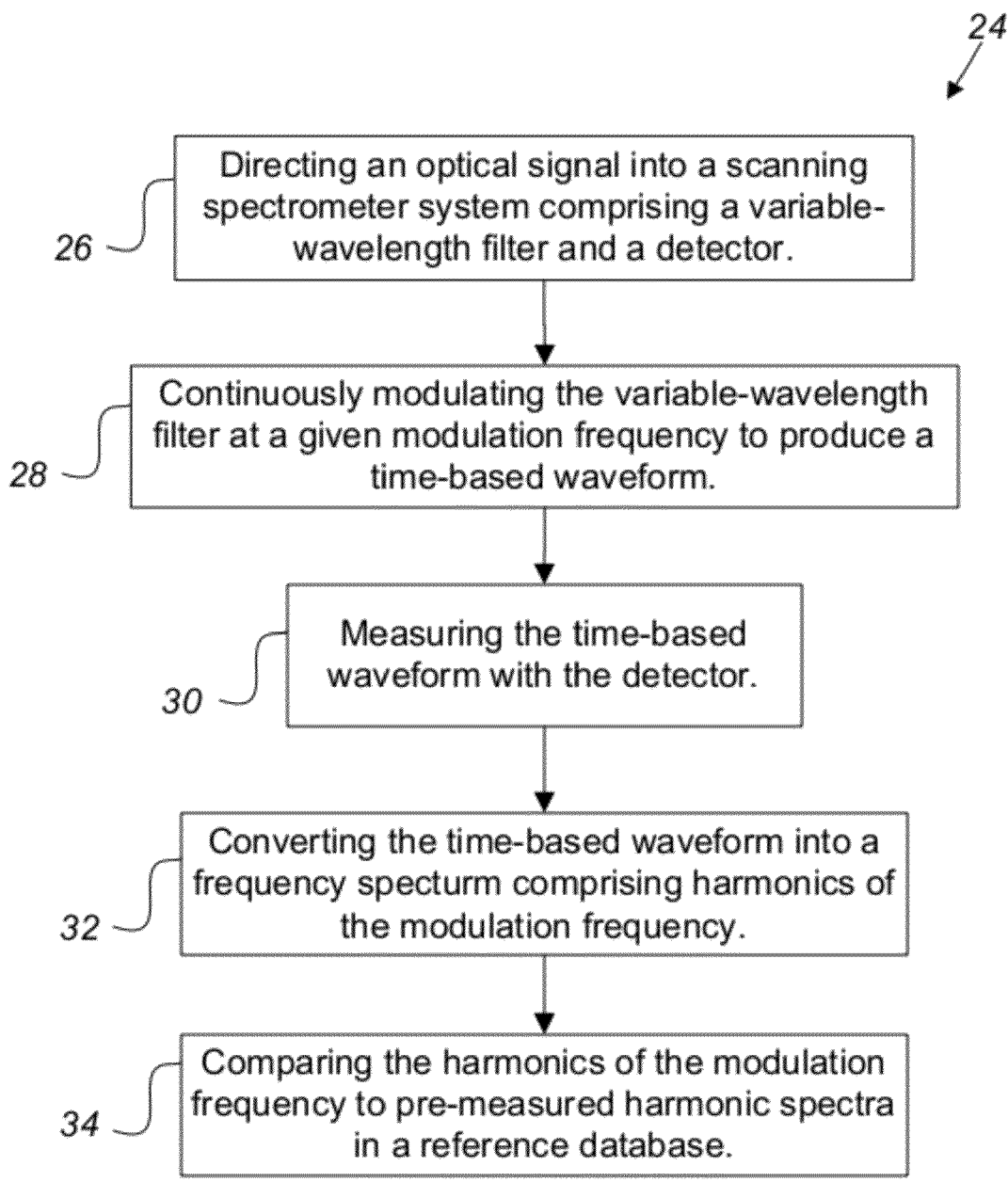
FIG. 3 is a flowchart showing steps of a method for analyzing an optical signal.

FIG. 3 is a flowchart illustrating the steps of a method 24 for analyzing an optical signal. The first step 26 of method 24 comprises the step of directing the optical signal into a scanning spectrometer system comprising a variable-wavelength filter and a detector 18. Step 28 provides the step of continuously modulating the variable-wavelength filter at a given modulation frequency to produce a time-based waveform such as the measured analog spectrum 22, depicted in FIG. 2. Step 30 provides the step of measuring the time-based waveform with the detector 18. Step 32 provides the step of converting the time-based waveform into a frequency spectrum comprising harmonics of the modulation frequency. Step 34 provides the step of comparing the harmonics of the modulation frequency to premeasured harmonic spectra in a reference database.

The scanning spectrometer system mentioned in method 24 may be a Fabry-Perot interferometer, a Michelson interferometer, an optical ring resonator filter, or any other means for processing the output of an optical filter. The scanning spectrometer system may be macro-scale or Micro-Electro-Mechanically (MEMs) based. In one example embodiment, the detector 18 may be integrated into the optical cavity 12. The variable-wavelength filter recited in method 24 may comprise any optical filter capable of varying the optical path length of an optical signal. Examples of the variable-wavelength filter include, but are not limited to, the optical cavity 12 of a Fabry-Perot interferometer 10, dielectric stacks manufactured through batch fabrication processes, sub-wavelength gratings, metallic coated surfaces, and refractive index boundaries.

Figure 4:
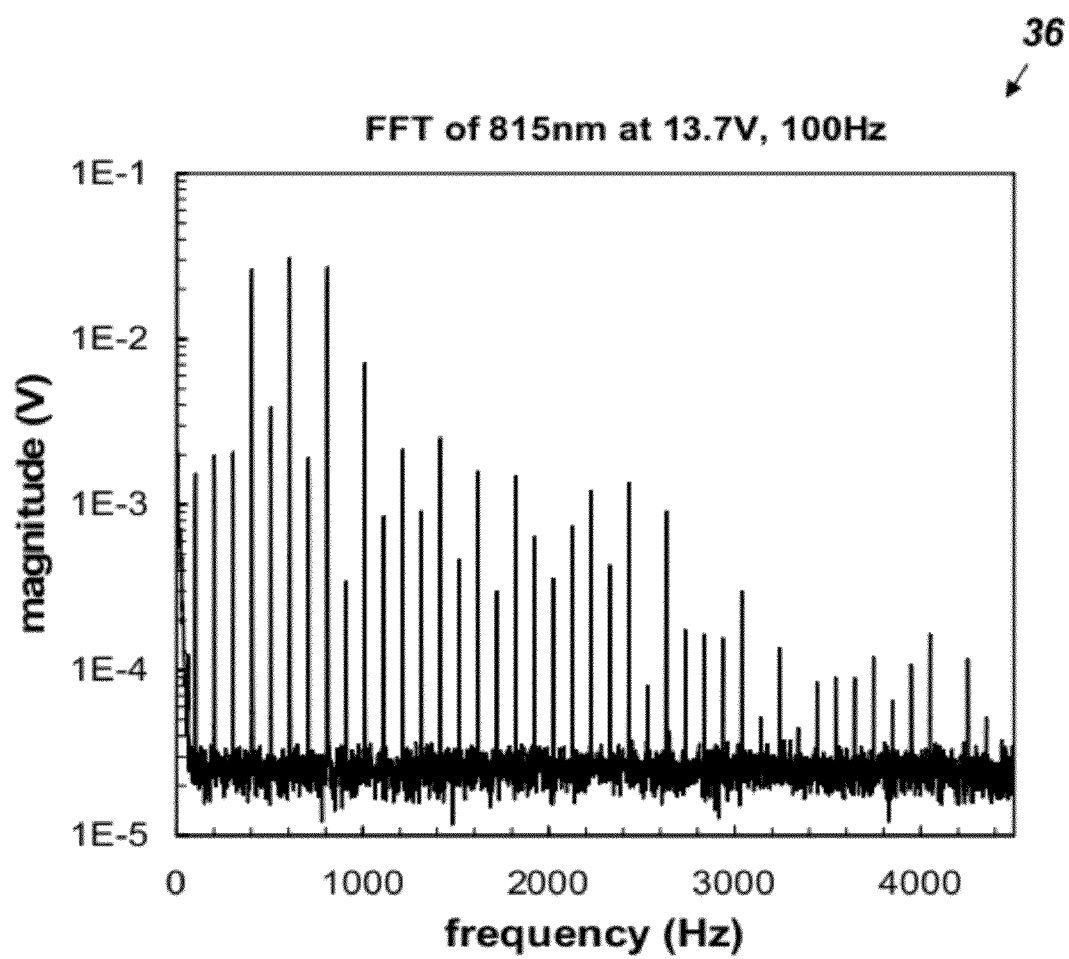
FIG. 4 is a plot of a frequency domain transmission spectrum.

Step 32 may be accomplished by taking a Fourier Transform (translation to frequency domain) of the time-based waveform. In the embodiment of method 24 wherein the scanning spectrometer system is a Fabry-Perot interferometer, the mirror 14 may be modulated continuously with respect to mirror 16 by means of electrostatic actuation of mirror 14—thereby obtaining the analog spectrum 22, which is measured by the detector 18. However, it is to be understood that the means of modulating the mirror 14 is not limited to electrostatic actuation, but may be any effective means of modulating such as the following non-limiting examples: electromagnetic actuation and thermal actuation. The mirror 14 may have any number of electrodes coupled thereto to effectuate the desired movement. For example, electrode arrays may be coupled to each mirror structure to allow for leveling and alignment of the optical cavity 12. In another example, an electrode may be operatively coupled to each mirror corner. However, it is to be understood that, the shape of the electrode(s) or the mirror 14 can be any arbitrary shape and does not necessarily have to have corners. In yet another example, electrodes may be mounted both above and below the movable mirror 14 to allow the mirror 14 to be actively pulled in both directions. A Fourier Transform is then taken of the analog spectrum 22 measured by the detector 18. The resulting frequency spectrum 36 will be composed of the frequency of the driving waveform and its harmonics. FIG. 4 shows the resulting frequency spectrum 36 resulting from the conversion of the analog spectrum 22 shown in FIG. 2. The amplitude and location of harmonics of the frequency spectrum 36 will be unique to the sample under investigation, (in this case substance A) and can be matched to an identifying harmonic spectrum from a premeasured database. Identification can be determined by monitoring key harmonic components, or by means of various correlation techniques.

Method 24 may further comprise the step 38 of preprocessing the time-based waveform prior to converting the time-based waveform into a frequency spectrum. For example, in each modulation cycle, one may invert the inverse responses (time-based waveform comprise temporally inverse responses and non-inverted responses) so that all responses temporally match. Step 38 may also comprise compensating for nonlinearities in the scanning spectrometer system prior to converting the time-based waveform into a frequency spectrum 36.

The step of comparing the harmonics of the modulation frequency to premeasured harmonic spectra in a reference database (i.e. step 34) may comprise the step of comparing critical harmonic peaks to spectrums in a look-up table. Alternatively, the phase of the harmonic peaks of the modulation frequency may be compared to values in a look-up table.

Here is an example embodiment of how the method 24 may be used to analyze a Raman or Surface Enhanced Raman Spectroscopy (SERS) emission from an unknown sample substance. First, the emission is directed into a resonant cavity of a Fabry-Perot interferometer 10, wherein the resonant cavity 12 comprises first and second mirrors 14 and 16. Next, the position of the first mirror 14 with respect to the second mirror 16 is modulated at a given modulation frequency. Then, a time-based spectrum 22 is measured at a detector 18 over time as a function of first mirror 14 position. A Fourier Transform of the time-based spectrum 22 is then taken to obtain a frequency-based spectrum 36 centered around the modulation frequency. Information about the shape of the time-based spectrum 22 is determined based on the phase and amplitude of the harmonics of the modulation frequency. The phase and amplitude of the harmonics are then compared to premeasured harmonic spectra in a reference database. From there, the presence of chemical or biological agents within the sample is established by discriminating distinguishing components of each agent within the frequency-based spectrum 36. The method 24 may be used with any type of spectroscopy such as absorption and florescence spectroscopy.

From the above description of the optical signal analyzing method 24, it is manifest that various techniques may be used for implementing the concepts of method 24 without departing from its scope. The described embodiments are to be considered in all respects as illustrative and not restrictive. It should also be understood that method 24 is not limited to the particular embodiments described herein, but is capable of many embodiments without departing from the scope of the claims.

We claim:

1. A method for analyzing an optical signal comprising:
   directing the optical signal into a scanning spectrometer system comprising a variable-wavelength filter and a detector;
   continuously modulating the variable-wavelength filter at a given modulation frequency to produce a time-based waveform over multiple modulation cycles;
   measuring the time-based waveform with the detector;
   converting the time-based waveform into a frequency spectrum comprising harmonics of the modulation frequency; and
   comparing the harmonics of the modulation frequency to premeasured harmonic spectra in a reference database.

2. The method of claim 1, wherein the scanning spectrometer system comprises a Fabry-Perot interferometer and wherein the variable-wavelength filter comprises two parallel reflective surfaces wherein one of the surfaces is movable with respect to the other surface.

3. The method of claim 2, wherein the step of converting the time-based waveform into a frequency spectrum is accomplished by taking a Fourier Transform of the time-based waveform.

4. The method of claim 3, wherein the scanning spectrometer system is Micro-Electro-Mechanically (MEMs) based.

5. The method of claim 4, wherein the step of continuously modulating the variable-wavelength filter is performed by electrostatic actuation of one of the surfaces.

6. The method of claim 5, wherein the electrostatic actuation is accomplished with a single electrode coupled to one of the surfaces.

7. The method of claim 5, wherein the surfaces are rectangular and wherein the electrostatic actuation is accomplished with four electrodes, one electrode coupled to each corner of one of the surfaces.

8. The method of claim 5, wherein the optical signal is a Raman or Surface Enhanced Raman Spectroscopy (SERS) emission from a sample.

9. The method of claim 8, further comprising analyzing the frequency spectrum for the presence of multiple chemical or biological agents within the sample, by discriminating distinguishing components of each agent within the frequency spectrum.

10. The method of claim 5, wherein the two parallel reflective surfaces define an optical cavity and wherein the detector is integrated into the optical cavity.

11. The method of claim 3, further comprising preprocessing the time-based waveform prior to converting the time-based waveform into a frequency spectrum.

12. The method of claim 11, wherein in each modulation cycle, the time-based waveform comprises temporally inverse responses and non-inverted responses, and wherein the step of preprocessing comprises inverting the inverse responses so that all responses temporally match.

13. The method of claim 12, wherein the step of preprocessing further comprises compensating for nonlinearities in the scanning spectrometer system.

14. The method of claim 1, wherein the variable-wavelength filter comprises dielectric stacks manufactured through batch fabrication processes.

15. The method of claim 1, wherein the variable-wavelength filter comprises sub-wavelength gratings.

16. The method of claim 1, wherein the variable-wavelength filter comprises metallic coated surfaces.

17. The method of claim 1, wherein the variable-wavelength filter comprises refractive index boundaries.

18. The method of claim 1, wherein the step of comparing the harmonics of the modulation frequency further comprises comparing critical harmonic peaks to spectrums in a look-up table.

19. The method of claim 1, wherein the step of comparing the harmonics of the modulation frequency further comprises comparing the phase of harmonic peaks to values in a look-up table.

20. A method for analyzing a Raman or Surface Enhanced Raman Spectroscopy (SERS) emission from a sample comprising:
    directing the emission into a resonant cavity of a Fabry-Perot interferometer, wherein the resonant cavity comprises first and second mirrors;
    modulating the position of the first mirror with respect to the second mirror at a given modulation frequency;
    measuring a time-based spectrum over time as a function of first mirror position at a detector over multiple modulation cycles;
    taking a Fourier Transform of the time-based spectrum to obtain a frequency-based spectrum centered around the modulation frequency;
    determining information about the shape of the time-based spectrum based on the phase and amplitude of the harmonics of the modulation frequency;
    comparing the information to premeasured harmonic spectra in a reference database; and
    establishing the presence of chemical or biological agents within the sample, by discriminating distinguishing components of each agent within the frequency-based spectrum.

* * * * *